United States Patent
Inanc et al.

(10) Patent No.: US 8,471,197 B2
(45) Date of Patent: Jun. 25, 2013

(54) PULSED NEUTRON BASED MONITORING OF $CO_2$ IN ENHANCED RECOVERY AND SEQUESTRATION PROJECTS

(75) Inventors: Feyzi Inanc, Spring, TX (US); Daniel Georgi, Houston, TX (US); W. Allen Gilchrist, Houston, TX (US); Xiaogang Han, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 345 days.

(21) Appl. No.: 12/821,797

(22) Filed: Jun. 23, 2010

(65) Prior Publication Data

US 2010/0332138 A1 Dec. 30, 2010

Related U.S. Application Data

(60) Provisional application No. 61/221,784, filed on Jun. 30, 2009.

(51) Int. Cl.
*G01V 7/10* (2006.01)
(52) U.S. Cl.
USPC ............................................. 250/269.6
(58) Field of Classification Search
USPC .................. 250/254, 269.6, 269.7; 702/2, 8
See application file for complete search history.

(56) References Cited

U.S. PATENT DOCUMENTS

| | | | |
|---|---|---|---|
| 5,097,123 A | 3/1992 | Grau et al. | |
| 5,528,030 A * | 6/1996 | Mickael | 250/269.4 |
| 5,900,627 A | 5/1999 | Odom et al. | |
| 2002/0170348 A1* | 11/2002 | Roscoe et al. | 73/152.02 |
| 2007/0023625 A1* | 2/2007 | Trcka et al. | 250/269.6 |
| 2008/0023629 A1* | 1/2008 | Herron et al. | 250/269.6 |

OTHER PUBLICATIONS

D. Trcka et al., "Field Trials of a New Method for the Measurement of Formation Gas Using Pulsed-Neutron Instrumentation"; Society of Petroleum Engineers; SPE Paper No. 102350, Sep. 24-27, 2006.
Notification of Transmittal of the International Search Report and the Written Opinion of the International Searching Authority, or the Declaration; PCT/US2010/039950. Feb. 10, 2011.

* cited by examiner

*Primary Examiner* — Michael G Lee
*Assistant Examiner* — Matthew Mikels
(74) *Attorney, Agent, or Firm* — Cantor Colburn LLP (57) ABSTRACT

A method for estimating a concentration of carbon dioxide ($CO_2$) in a formation penetrated by a borehole, the method includes: conveying a carrier through the borehole; irradiating the formation with neutrons from a neutron source disposed at the carrier; detecting photons from the formation resulting from the irradiating; and estimating the concentration of $CO_2$ from data acquired from the detecting.

20 Claims, 10 Drawing Sheets

PULSED NEUTRON BASED MONITORING OF $CO_2$ IN ENHANCED RECOVERY AND SEQUESTRATION PROJECTS

CROSS-REFERENCE TO RELATED APPLICATIONS AND PRIORITY CLAIM

This application claims the benefit of U.S. Provisional Application Ser. No. 61/221,784, entitled "PULSED NEUTRON BASED MONITORING OF CO2 IN ENHANCED RECOVERY AND SEQUESTRATION PROJECTS", filed Jun. 30, 2009, under 35 U.S.C. §119(e), which is incorporated herein by reference in its entirety.

BACKGROUND OF THE INVENTION

1. Field of the Invention

The present invention relates to monitoring carbon dioxide in an earth formation. In particular, the monitoring is performed in a borehole penetrating the earth formation.

2. Description of the Related Art

Injection of carbon dioxide ($CO_2$) into earth formations known to contain reservoirs of hydrocarbons is being increasingly used to enhance recovery of the hydrocarbons. It is important to know the levels of $CO_2$ in the formations to properly conduct the enhanced recovery. Thus, it is important to be able to monitor the levels of $CO_2$.

Another application in which it is important to monitor the levels of $CO_2$ is sequestration of $CO_2$. Advanced coal burning electric generating plants are able to scrub $CO_2$ from emissions. Because of various financial incentives, generating plants are investigating sequestering the $CO_2$ in depleted reservoirs. Accordingly, the $CO_2$ needs to be monitored to prevent its escape into the atmosphere.

Whether used for the enhanced recovery of hydrocarbons or the sequestration of $CO_2$, boreholes provide an avenue for monitoring levels of $CO_2$. Since the boreholes may be used repeatedly time and again, it is quite normal for those wells to go through some type of completion that will involve placement of casings for borehole stability. Unfortunately, such completions usually eliminate a significant portion of technologies from being used to monitor levels of $CO_2$ from within a completed borehole.

Therefore, what are needed are techniques to monitor levels of $CO_2$ from within a completed borehole.

BRIEF SUMMARY OF THE INVENTION

Disclosed is a method for estimating a concentration of carbon dioxide ($CO_2$) in a formation penetrated by a borehole, the method includes: conveying a carrier through the borehole; irradiating the formation with neutrons from a neutron source disposed at the carrier; detecting photons from the formation resulting from the irradiating; and estimating the concentration of $CO_2$ from data acquired from the detecting.

Also disclosed is an apparatus configured to estimate a concentration of carbon dioxide ($CO_2$) in a formation penetrated by a borehole, the apparatus having: a carrier configured to be conveyed through the borehole; a neutron source disposed at the carrier and configured to irradiate the formation with neutrons; a first detector spaced a first distance from the neutron source and configured to detect photons from the formation resulting from the irradiating; a second detector spaced a second distance from the neutron source and configured to detect photons from the formation resulting from the irradiating; and a processor coupled to the first and second detectors and configured to estimate the concentration of $CO_2$ from data acquired from the detectors.

Further disclosed is a machine-readable medium having machine-executable instructions for estimating a concentration of carbon dioxide ($CO_2$) in a formation penetrated by a borehole by executing a method including: detecting photons from the formation resulting from irradiating the formation with neutrons from a neutron source disposed within the borehole; and estimating the concentration of $CO_2$ from data acquired from the detecting.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are exemplary embodiments of techniques for measuring levels (also referred to as concentrations) of carbon dioxide ($CO_2$) in an earth formation from within a borehole penetrating the formation. The techniques, which include apparatus and method, are applicable to a borehole being completed with a casing or tubular.

The techniques for measuring levels of $CO_2$ call for irradiating the earth formation with fast neutrons, which are relatively insensitive to the casing material. The neutrons are emitted as a pulse or burst from a neutron source disposed within the borehole. The neutrons interact with materials in the formation in accordance with various interaction mechanisms to produce photons. The photons emitted from the materials may also be referred to as gamma rays. The photons are received through the casing, counted and have their energy measured. Time spectra and/or energy spectra of the received photons are analyzed to estimate levels of carbon (C) and oxygen (O), which in turn are used to estimate the levels of $CO_2$.

More specifically, the fast neutrons having energy of about 14 MeV interact with borehole materials, formation materials, and fluids occupying the pore space in the formation. The fluid occupying the pore space contains varying amounts of $CO_2$ by interfacing with, mixing with, or dissolving the $CO_2$. The $CO_2$ has various physical properties driven by formation temperature, pressure and the formation fluid. The techniques disclosed herein account for the neutron interactions with the various materials and the various physical properties of $CO_2$ to estimate the levels of $CO_2$.

Two of the main interaction mechanisms among others are neutron capture and neutron inelastic scattering which can generate photons or neutron-induced gamma rays. The terms "neutron capture" or "capture" make reference to a kind of nuclear interaction in which a neutron collides with an atomic nucleus and is merged into the nucleus, thus forming a heavier nucleus. As a result, the heavier nucleus enters into a higher energy state. At least some of the energy of the neutron capture interaction is usually lost by emission of gamma rays. The term "thermalize" generally relates a process for reducing the kinetic energy of a neutron to a thermal energy of about 0.025 eV. The terms "inelastic collision," "neutron inelastic scattering" or "inelastic" make reference to a collision in which an incoming neutron interacts with a target nucleus and causes the nucleus to become excited, thereby releasing a gamma ray before returning to the ground state. In inelastic collisions, the incoming neutron is merged into the target nucleus, and transfers some of its energy to the target nucleus before that energy is released in the form of a gamma ray.

Figure 1:
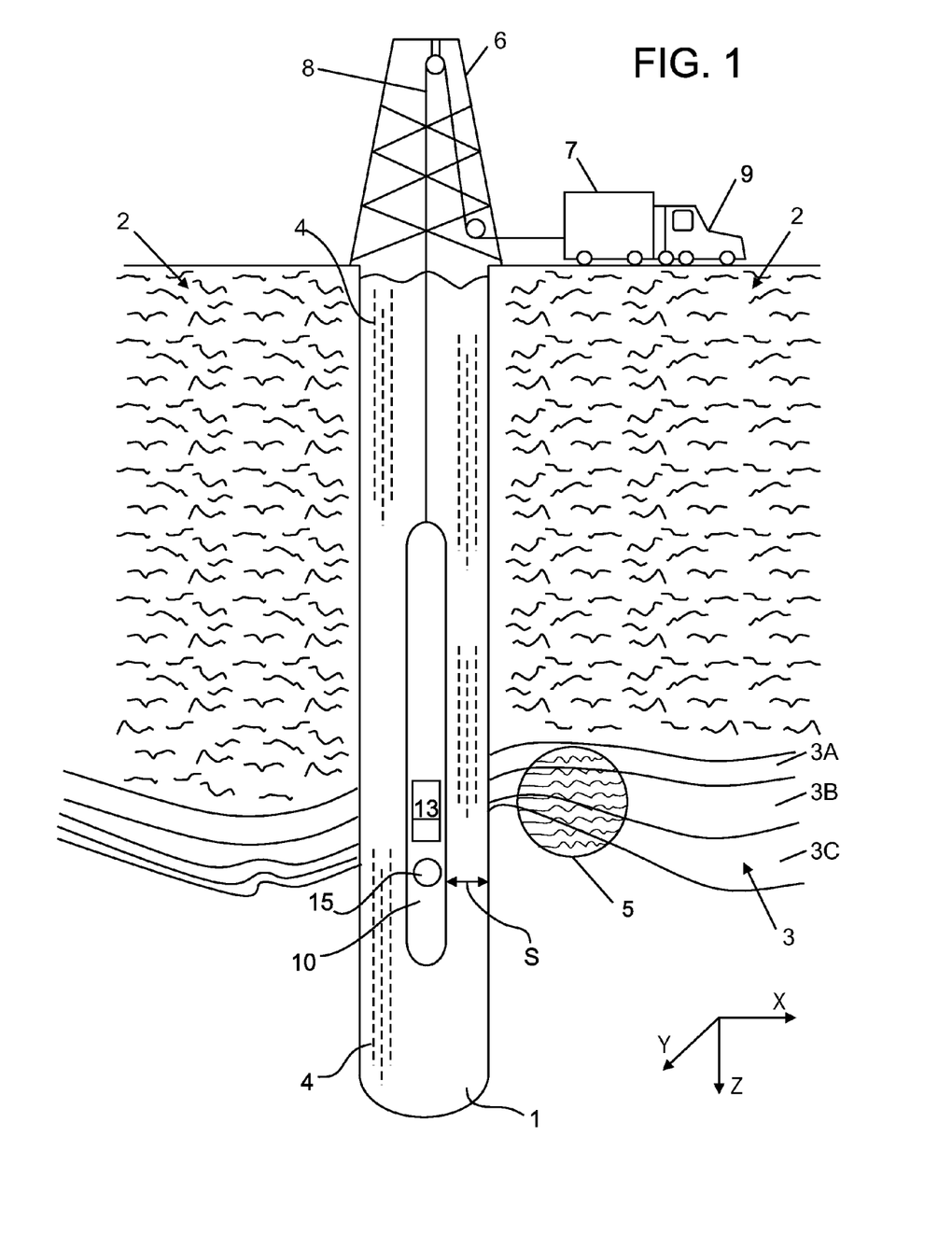
FIG. 1 illustrates an exemplary embodiment of a logging tool disposed in a borehole penetrating the earth.

Apparatus for implementing the techniques disclosed herein is now discussed. Reference may now be had to FIG. 1. FIG. 1 illustrates an exemplary well logging instrument 10 (also referred to as a "tool") for wireline logging shown disposed in a wellbore 1 (also referred to as a "borehole"). The wellbore 1 generally traverses sub-surface materials, which may include various formations 3 (shown as formations 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as fluids, gases, liquids, and the like. The formations 3 in FIG. 1 contain carbon dioxide shown at 5. As a matter of convention, a depth of the wellbore 1 is described along a Z-axis, while a cross-section is provided on a plane described by an X-axis and a Y-axis. Prior to well logging with the logging instrument 10, the wellbore 1 is drilled into the Earth 2 using a drilling rig.

In some embodiments, the wellbore 1 has been filled, at least to some extent, with drilling fluid 4. The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the logging instrument 10 and a wall of the wellbore 1. This layer is referred to as a "standoff layer," and includes a thickness, referred to as "standoff, S."

The logging instrument 10 is lowered into the wellbore 1 using a wireline 8 deployed by a derrick 6 or similar equipment. Generally, the wireline 8 includes suspension apparatus, such as a load bearing cable, as well as other apparatus. The other apparatus may include a power supply, a communications link (such as wired or optical) and other such equipment. Generally, the wireline 8 is conveyed from a service truck 9 or other similar apparatus (such as a service station, a base station, etc, . . . ). Often, the wireline 8 is coupled to topside equipment 7. The topside equipment 7 may provide power to the logging instrument 10, as well as provide computing and processing capabilities for at least one of control of operations and analysis of data.

Generally, the logging instrument 10 includes apparatus for performing measurements "downhole" or in the wellbore 1. Such apparatus include, for example, a variety of components 15. Exemplary components 15 may include a neutron source and radiation detectors. The components 15 may communicate with downhole electronics 13. The measurements and other sequences as may be performed using the logging instrument 10 are generally performed to ascertain a concentration of carbon dioxide.

While shown as a wireline logging tool in FIG. 1, the logging tool 10 may also be disposed at a drill string for logging-while-drilling (LWD) applications when the borehole is not competed with a casing.

Figure 2:
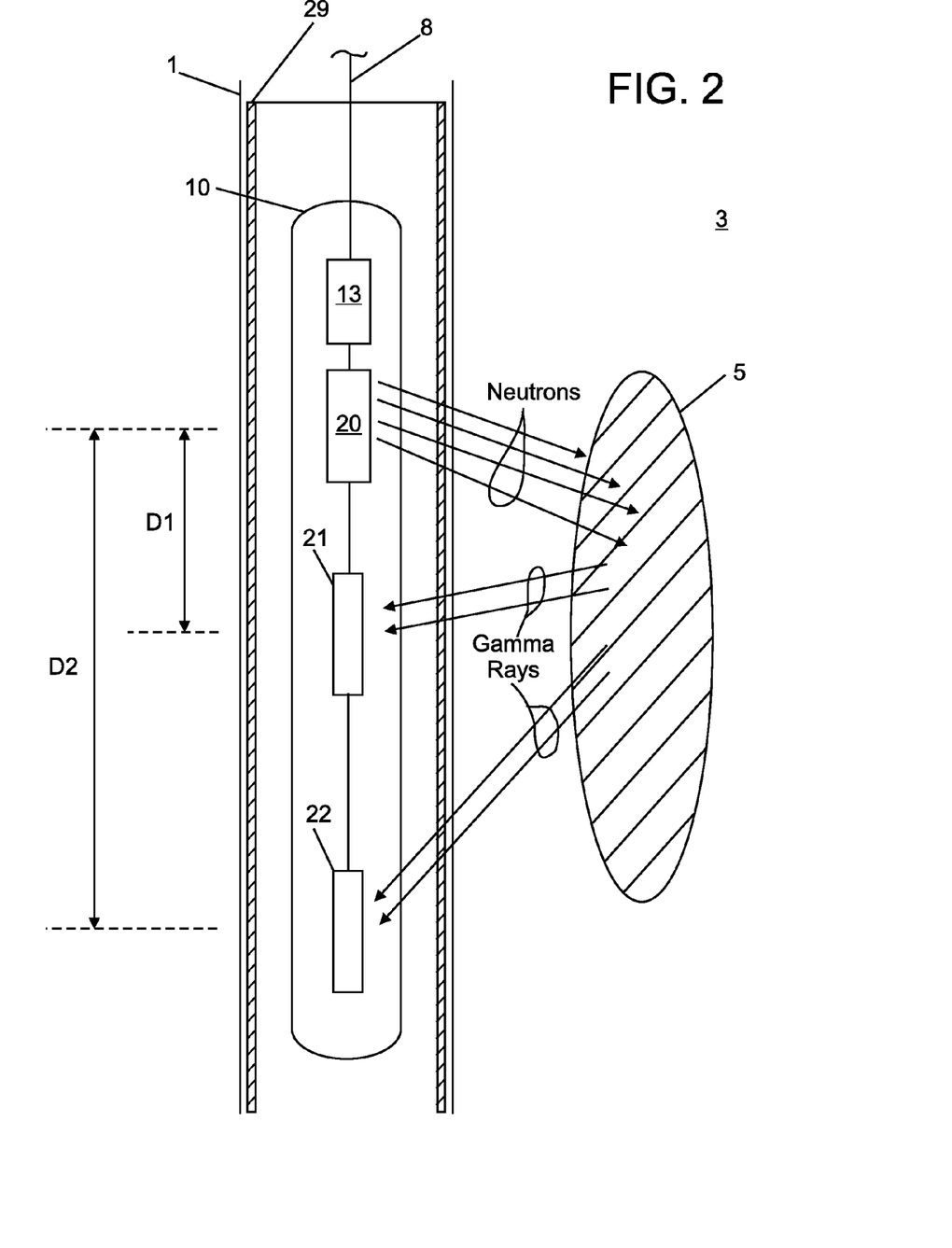
FIG. 2 depicts aspects of the logging tool.

FIG. 2 depicts aspects of the logging tool 10 disposed within a casing 29 in the borehole 1. Referring to FIG. 2, the logging tool 10 includes a neutron source 20. In one embodiment, the neutron source 20 is a pulsed neutron source configured to emit a pulse or burst of neutrons. It should be noted that a variety of neutron emitting sources are known. Examples include americium-beryllium (AmBe) sources, plutonium-beryllium (PuBe) sources, californium sources (e.g., Cf-242) and others. Therefore, while the teachings herein are generally directed to a pulsed neutron source, it should be recognized that the term "neutron emitting," "neutron generator," and the like may be considered with reference to the variety of sources now available or subsequently devised for providing neutrons downhole.

Still referring to FIG. 2, the logging tool 10 also includes a first detector 21 spaced a first distance (D1) from the neutron source 20. The first detector 21 is configured to detect gamma rays (i.e., photons) emitted by the formations 3 as a result of irradiation with the neutrons emitted from the neutron source 20. Detecting photons can include counting the photons, measuring the energy of each detected photon, and measuring the time of detection with respect to time of the neutron pulse. Thus, the first detector 21 can acquire data that can be used to provide a time spectrum and/or an energy spectrum.

Still referring to FIG. 2, the logging tool 10 also includes a second detector 22 spaced a second distance (D2) from the neutron source 20. The second detector 22 is similar to the first detector 21 with respect to detecting photons emitted by the formations 3. In general, the second distance is greater than the first distance. Accordingly, the detectors 21, 22 provide a greater spatial range over which the emitted photons can be detected than if the logging tool 10 had only one detector. In addition, each detector can provide a data set that can be compared to the data set of the other detector. Comparison of data from multiple detectors, such as in the form of a ratio, can be used as an indicator to estimate the level of $CO_2$.

In the logging tool 10 having multiple detectors, the detector closest to the neutron source 20 is referred to as the "short spaced detector" and the detector furthest from the neutron source 20 is referred to as the "extra long spaced detector." Accordingly, in one embodiment, the first detector 21 is the short spaced detector and the second detector 22 is the extra long spaced detector.

As used herein, the term "gamma radiation detector," "radiation detector," "detector" and other related terms generally reference instruments that measure the gamma radiation (or photons) entering the detectors 21, 22. For example, the gamma radiation detector may use a scintillator material that interacts with gamma radiation and produces light photons, which are in turn detected by a photomultiplier tube or photodetector coupled to electronics. Exemplary gamma radiation detectors include, without limitation, sodium iodide (NaI), cesium iodide (CsI), bismuth germinate (BGO), thallium iodide (TlI), and other organic crystals, inorganic crystals, plastics, solid state detectors, and combinations thereof.

While operating in the subsurface environment, the electronically timed pulsed-neutron source 20 emits neutrons having energy of about 14 MeV. The neutrons are emitted into the ambient formation(s) 4 and the subsurface materials. In about 1-2 μsecs, these fast neutrons promptly interact with the nuclei of the surrounding sub-surface materials and scatter elastically as well as inelastically, ultimately losing their energy. Some of the nuclei of the atoms with which the neutrons interact become energetically excited during the inelastic scattering process, after which they return to the ground state by emitting one or more gamma rays with energies characteristic of the parent isotope. This process results in the measured inelastic spectrum of gamma ray energies, and can only take place if the energy of the incident neutron is sufficient to raise the nucleus of the parent isotope to one or more of its excited energy levels, or bound states.

Embodiments of downhole tools using a pulsed neutron generator usually provide a burst of about 10E4-10E5 fast neutrons. When the neutron flux is averaged over time, this is equivalent to a steady state emission of about 10E8 neutrons/second. For these embodiments, an energy spectrum of the neutrons shows that the neutrons are very close to monoenergetic, and exhibit an initial energy of about 14.2 MeV, while an angular distribution of the neutrons is very close to isotropic. Therefore, neutrons provided by a pulsed neutron generator generally radiate in all directions, and penetrate not only into the formation direction but also into the tool itself. Accordingly, most tools making use of neutron sources include significant shielding for protection of other components.

In general, the neutron generator is pulsed for short periods followed by waiting periods where the signal generated by neutrons dies off in an exponential manner. Those sequences are repeated many times before a signal is reported back to the data acquisition system for further use toward quantifying formation characteristics.

When the neutron generator is turned on, the neutron emission will quickly climb up to a stable emission rate around $10^8$ neutrons/second and then will go down to zero level as soon as the generator is turned off. A typical burst usually takes around 40-60 microseconds. This time period is dictated by the slowing down rate of the neutrons from emission energy levels around 14 MeV to thermal energy levels less than 0.1 eV. The waiting period between the bursts is usually dictated by what type of data is to be obtained. If the employed technique aims using capture photons, the waiting period is usually around a couple of hundred microseconds. This waiting period will enable one to determine formation and borehole material thermal capture cross sections. If the employed technique is based on the photons generated through inelastic neutron interactions, there is no need to wait that long because most of those photons will be generated within first 10 microseconds of the burst. The capture photons that will also show up in the photon counts during the first 10 microseconds are later subtracted from the inelastic counts through a suitable background subtraction mechanism.

Figure 3:
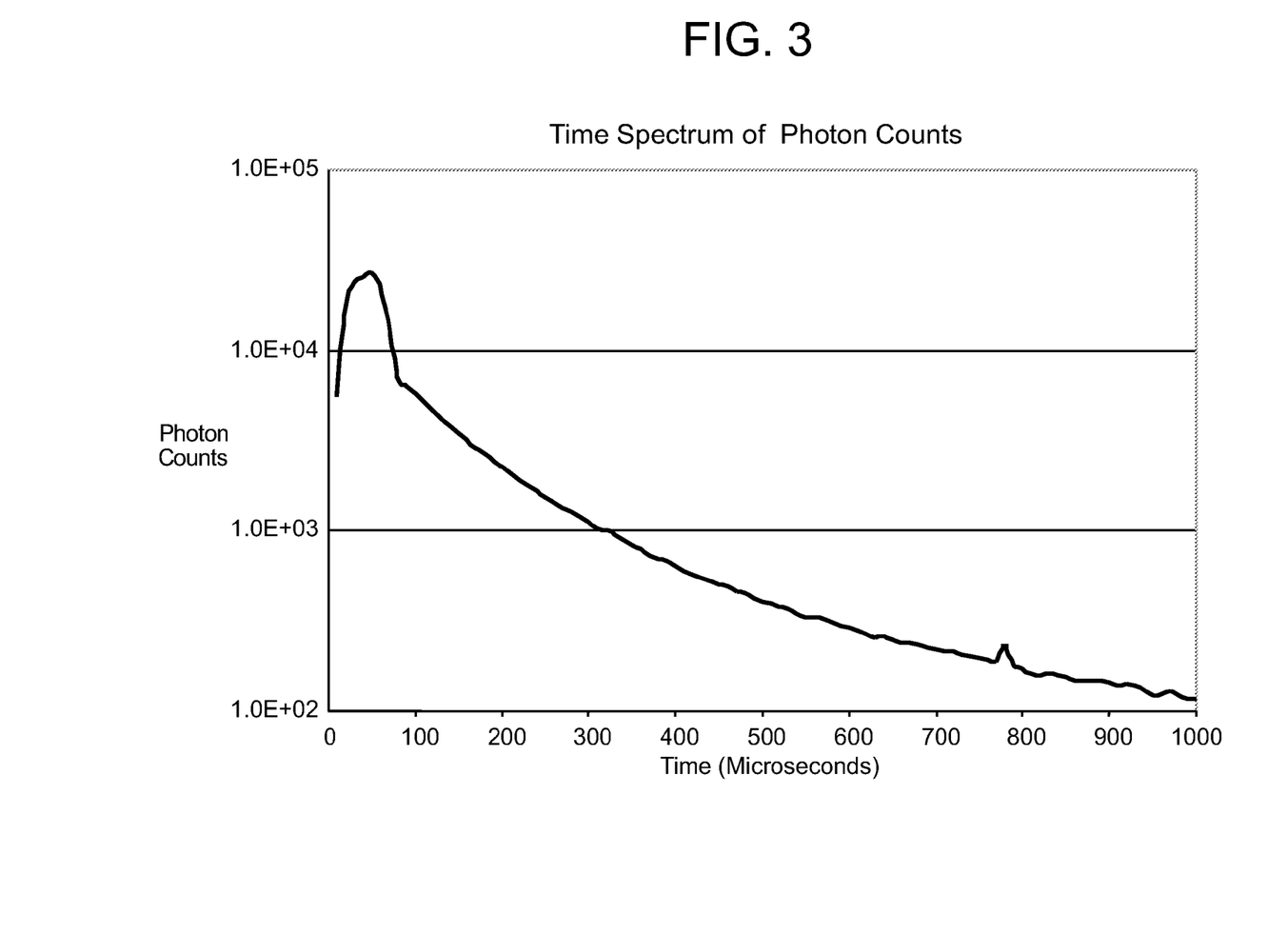
FIG. 3 illustrates an exemplary embodiment of a time spectrum of photon counts.

One of the techniques widely employed in pulse neutron logging is thermal capture cross-section determination of the formation. In that implementation, time spectrum of the photons generated by thermal capture interactions form the basis of measurements. One such spectrum is shown in FIG. 3. Referring to FIG. 3, the first approximately 60 microseconds show the rise and fall of the photon counts that are basically driven by the inelastic generation of photons through fast neutrons. Once the neutron generator is turned off, those photons from neutron inelastic scattering interactions disappear and the spectrum reaches an asymptotic rate of decline of photons from thermal neutron capture interactions. Those photons can be used for capture cross-section determinations.

Figure 4:
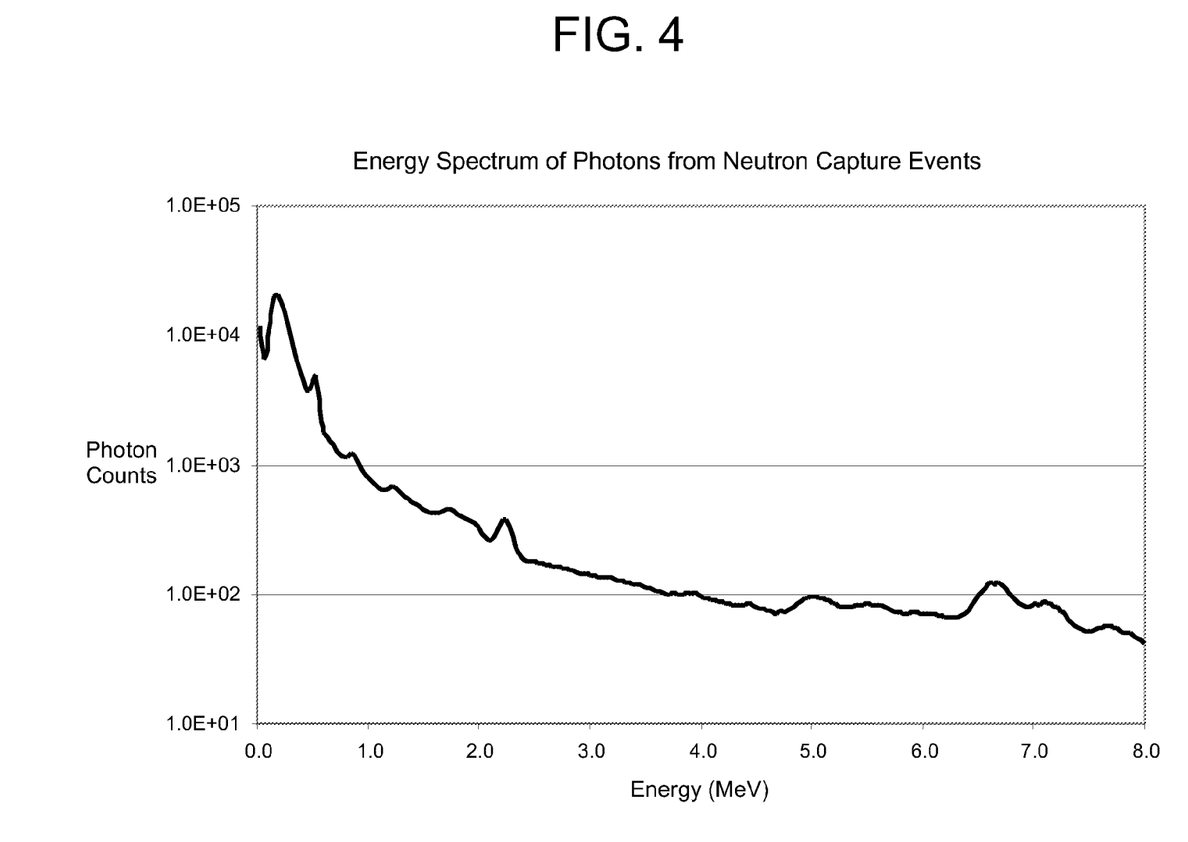
FIG. 4 illustrates an exemplary embodiment of an energy spectrum of photons from neutron capture events.

In addition to the time spectrum, an energy spectrum may be used for determining presence of various elements, such as C and O, in the environment surrounding the borehole. Such measurements require an efficient and accurate deconvolution of the energy spectra into its basic components driven by various elements in the formation. One example of the energy spectrum is illustrated in FIG. 4.

Figure 5:
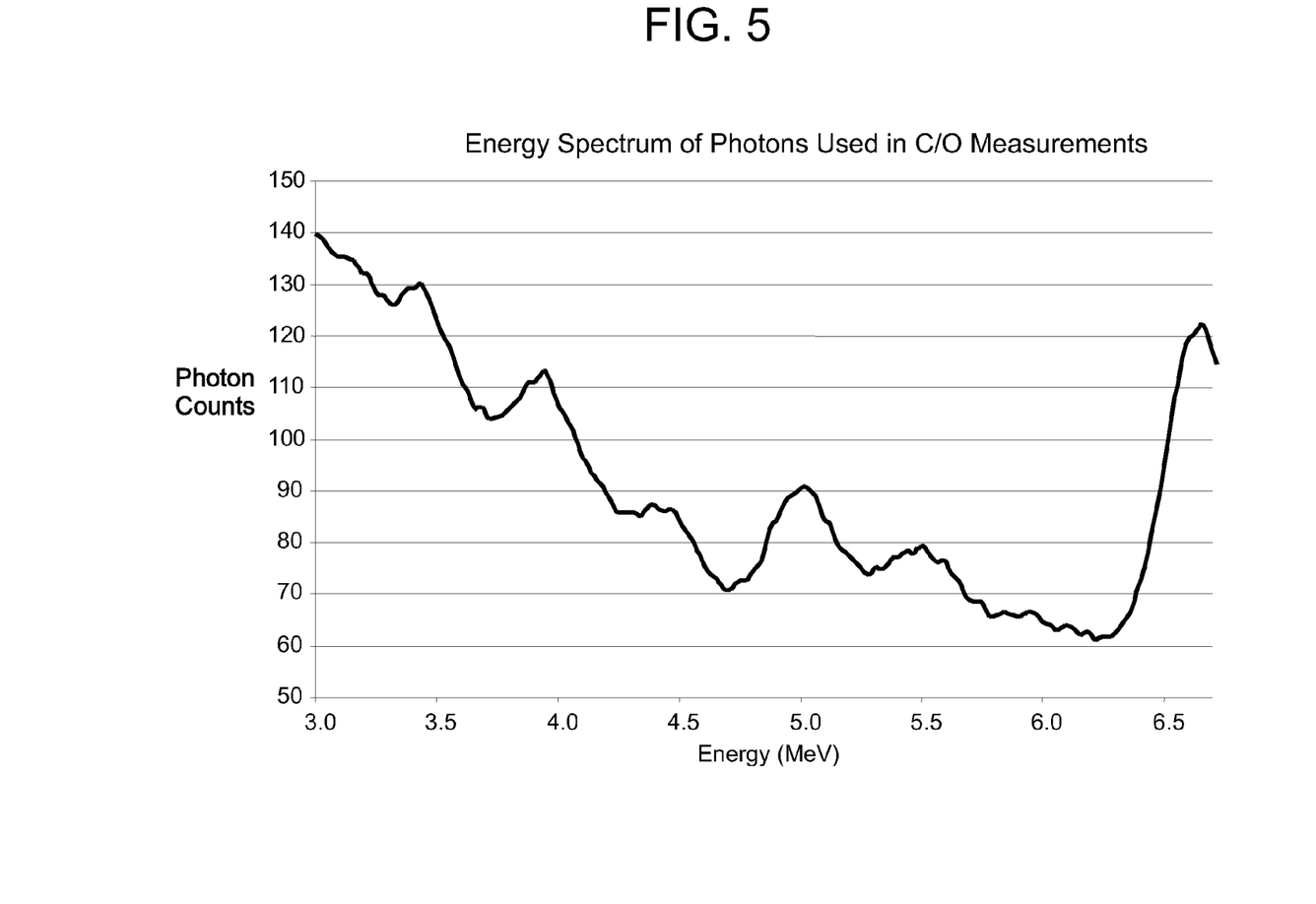
FIG. 5 illustrates an exemplary embodiment of an energy spectrum of photons used in carbon to oxygen ratio measurements.

Pulsed neutron-driven photons can be used to make carbon to oxygen ratio (C/O) measurements. C/O ratio measurements can be performed for determining the oil and water interface in the reservoirs in absence of highly saline waters. This method is based on the spectroscopy of photons generated by fast neutrons through interactions with carbon and oxygen in the formation. The spectrum of such a measurement is illustrated in FIG. 5.

As discussed herein, detection of gamma photons may be sorted by a number of detection events according to energy. Accordingly, a distinct or distinguishable grouping of detection events may be referred to by terms such as a "line," a "peak" and by other such terms as are known in the art. It is recognized that such energy groups may not actually appear as a "line" on a spectral graph. That is, it is recognized that, for example, energy groupings are not always distinct, such as when considering one type of radiation detector in comparison to another. Accordingly, interpretation of the presence of an energy group is subject to various techniques for qualifying spectral data. As interpretation of spectral data is generally known in the art, this aspect is not discussed in greater detail herein, however, it should be recognized that aspects of spectral analysis may involve complicated and even subjective interpretation.

Figure 6:
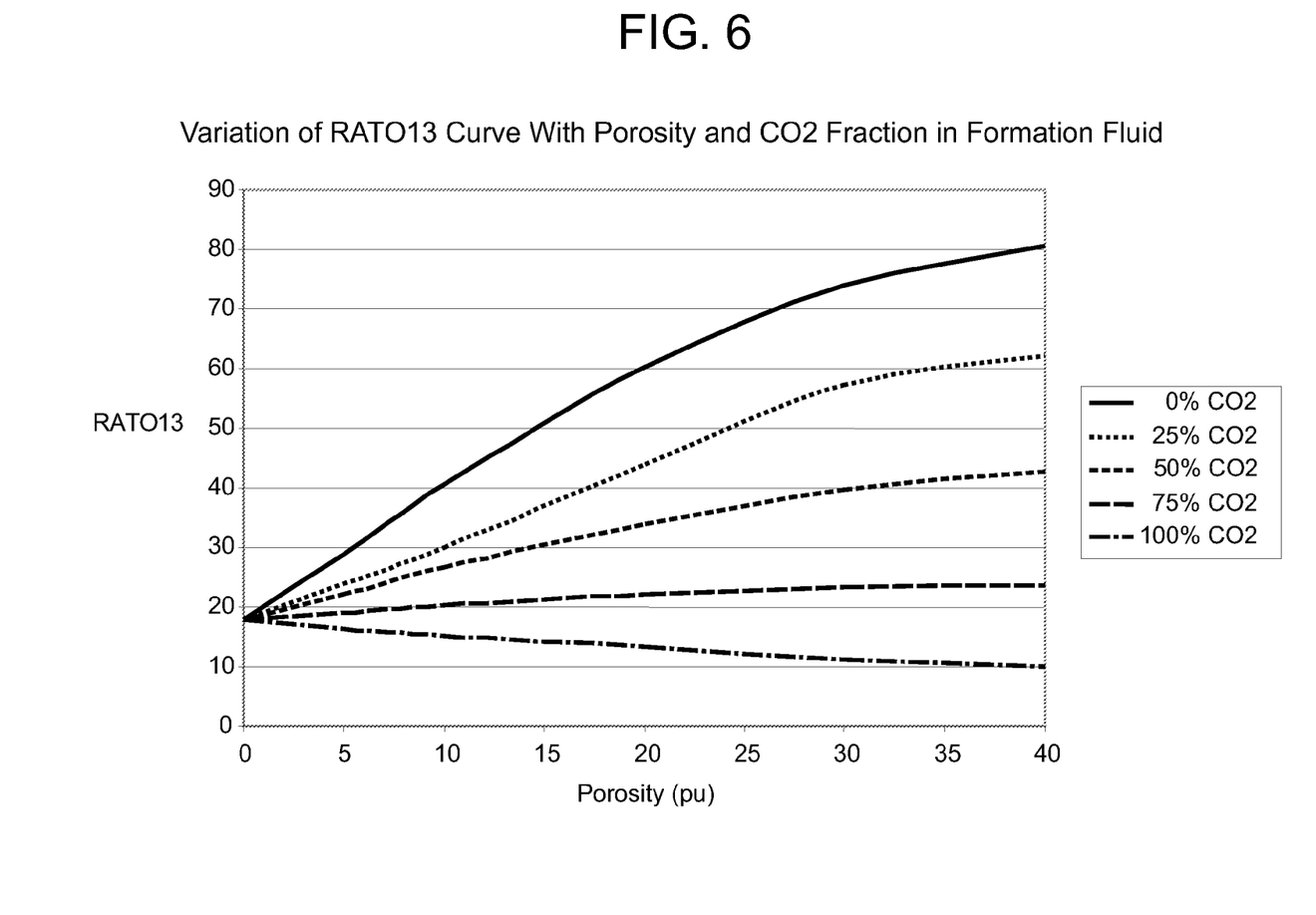
FIG. 6 illustrates an exemplary embodiment of a curve of a ratio of photons from thermal neutron capture interactions detected by a short spaced detector to the photons detected by an extra long spaced detector versus porosity for various $CO_2$ fractions in an oil borehole well.

In addition to the spectrums discussed above, other indicators are also used to determine the levels of $CO_2$ in the formations 3. One indicator is referred to herein is "RATO13." The RATO13 indicator is the ratio of photons from thermal neutron capture interactions detected by the short spaced detector to the photons from thermal neutron capture interactions detected by the extra long spaced detector. FIG. 6 illustrates an exemplary embodiment of a curve of RATO13 versus porosity for various $CO_2$ fractions in an oil borehole well, the oil having a density of 0.8 g/cc.

Figure 7:
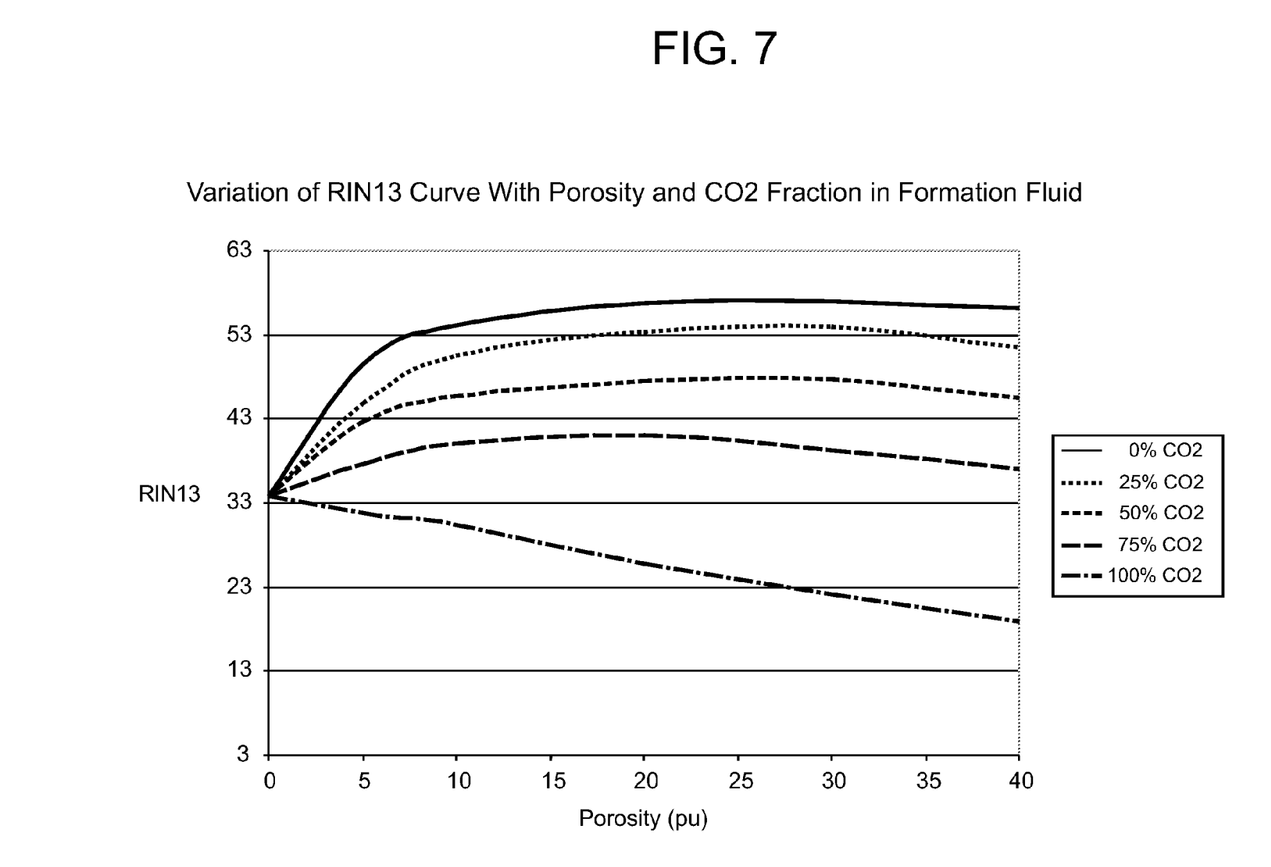
FIG. 7 illustrates an exemplary embodiment of a curve of a ratio of photons from high-energy neutron inelastic scattering interaction detected by the short spaced detector to the photons detected by the extra long spaced detector versus porosity for various $CO_2$ fractions in an oil borehole well.

Another indicator used to determine the levels of $CO_2$ in the formations 3 is referred to herein at "RIN13." The RIN13 indicator is the ratio of photons from fast neutron inelastic scattering interactions detected by the short spaced detector to the photons from fast neutron inelastic scattering interactions detected by the extra long spaced detector. FIG. 7 illustrates an exemplary embodiment of a curve of RIN13 versus porosity for various $CO_2$ fractions in the oil borehole well, the oil having a density of 0.8 g/cc.

Figure 8:
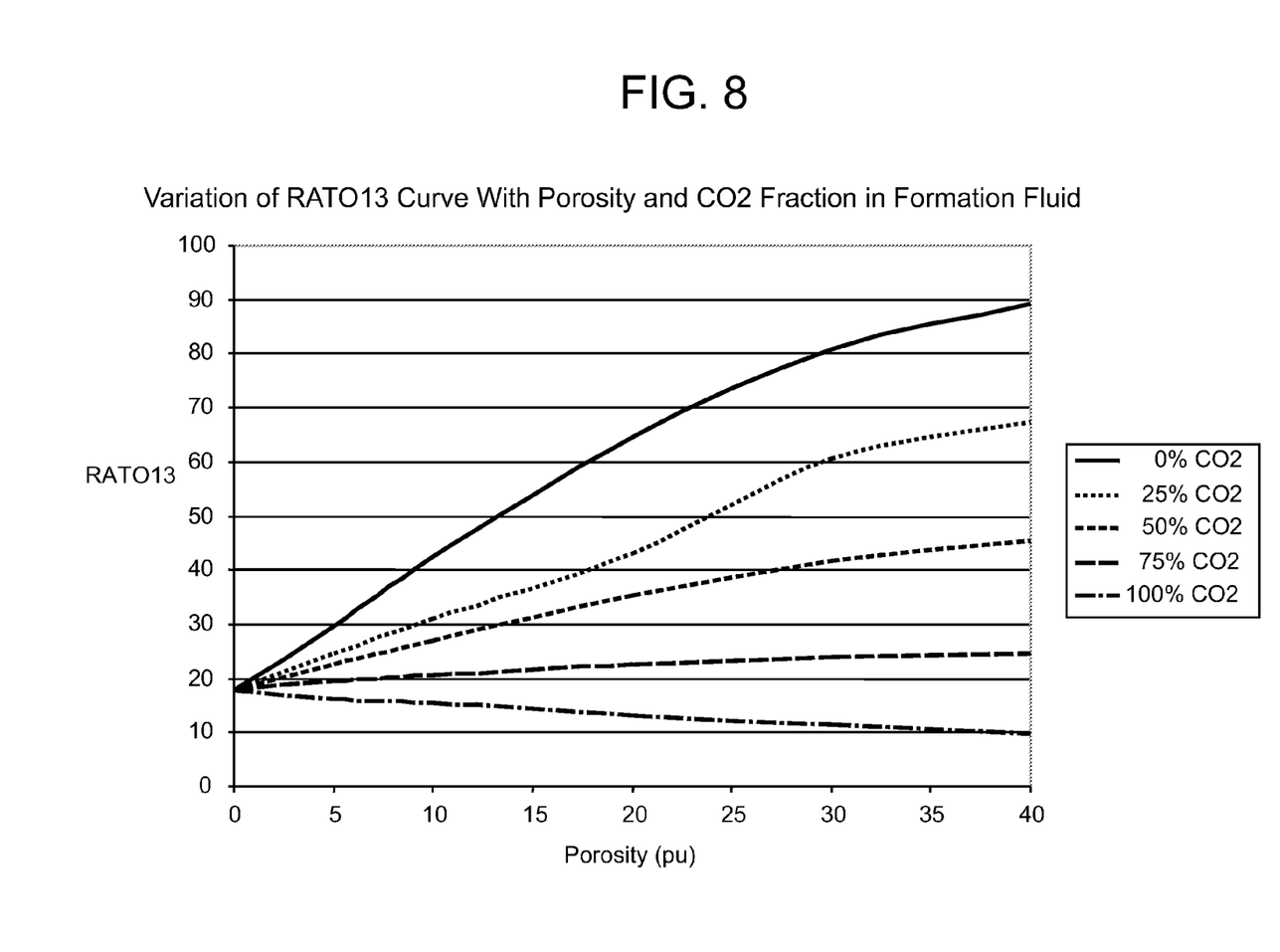
FIG. 8 illustrates an exemplary embodiment of a curve of a ratio of photons from thermal neutron capture interactions detected by the short spaced detector to the photons detected by the extra long spaced detector versus porosity for various $CO_2$ fractions in water borehole well.
Figure 9:
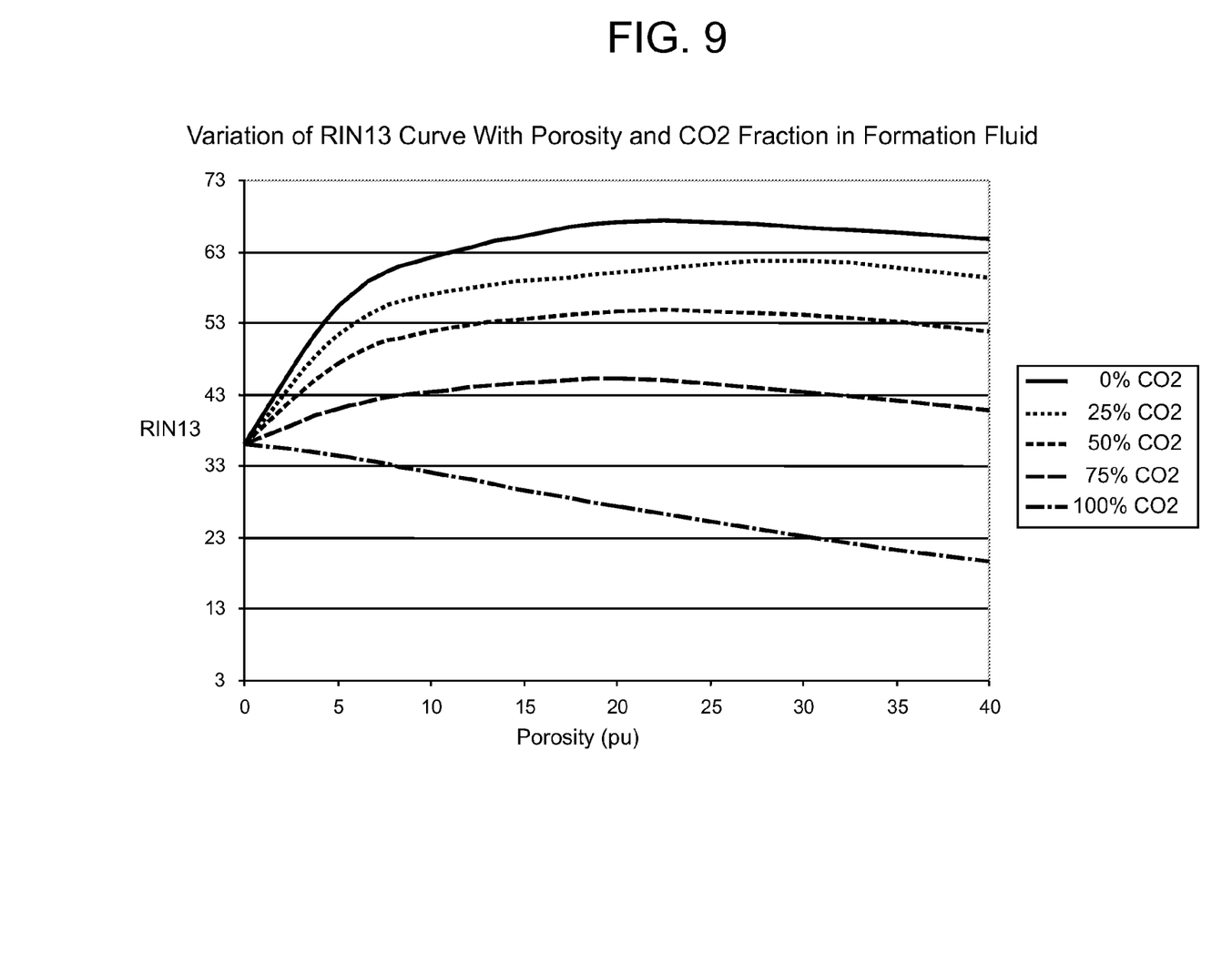
FIG. 9 illustrates an exemplary embodiment of a curve of a ratio of photons from high-energy neutron inelastic scattering interaction detected by the short spaced detector to the photons detected by the extra long spaced detector versus porosity for various $CO_2$ fractions in a water borehole well.

The RATO13 and RIN13 indicators can also be used to estimate levels of $CO_2$ in water borehole wells. FIG. 8 illustrates an exemplary embodiment of a curve of RATO13 versus porosity for various $CO_2$ fractions in a water borehole well. FIG. 9 illustrates an exemplary embodiment of a curve of RIN13 versus porosity for various $CO_2$ fractions in the water borehole well. As shown in FIGS. 6-9, the RATO13 and RIN13 indicators are very responsive to variations in levels of $CO_2$ in the formation fluid.

Both of the RATO13 and RIN13 indicators may be used to estimate the levels of $CO_2$. For a specific density level, the $CO_2$ level is estimated by interpolating between the 0% $CO_2$ line and the 100% $CO_2$ line. The 100% $CO_2$ line represents a $CO_2$ saturated case. The 0% $CO_2$ line represents a formation with no $CO_2$. Those two lines are determined by Monte Carlo based modeling techniques. The Monte Carlo based modeling techniques use specific borehole parameters and formation related variables for building a model.

Other important parameters that are required in determining $CO_2$ levels are $CO_2$ physical properties in the reservoir. CO2 in the reservoir conditions is likely to have different physical properties as a function of the reservoir temperature and pressure. While it may be a gas in some conditions, it may be in a supersaturated (or supercritical) state under some other conditions. In enhanced recovery projects, miscibility is an important issue. The physical properties of the oil and the amount of $CO_2$ that can mix with the oil will vary significantly because of miscibility.

The physical properties of $CO_2$ will have a significant impact on the thermal capture cross section (sigma) of the formation. The formation characteristics will change the neutron slowing down and thermalization characteristics and this will be reflected by the variations in the sigma measurements. Since the logging tool 10 is quite sensitive to the sigma values, measurements of sigma values using the logging tool 10 are used to determine the $CO_2$ physical properties in the formations 3. For example, from the sigma value of the formation, the state of the $CO_2$ can be estimated. Thus, pressure and temperature and, therefore, density can be determined from a $CO_2$ phase diagram. The $CO_2$ phase diagram as known in the art presents four states (i.e., solid, liquid, gas, and supercritical fluid) as a function of pressure and temperature. In the supercritical state, the $CO_2$ can diffuse through solids like a gas and dissolve materials like a liquid. In addition, when $CO_2$ is close to the critical point, small changes in pressure or temperature result in large changes in density.

As with RIN13 and RATO13 indicators, the maximum and minimum values of sigma can be determined for given well conditions that will result in determining unique $CO_2$ physical properties. Once those properties are determined, they can be used for determining proper RIN13 and RATO13 ranges for a given well configuration.

Figure 10:
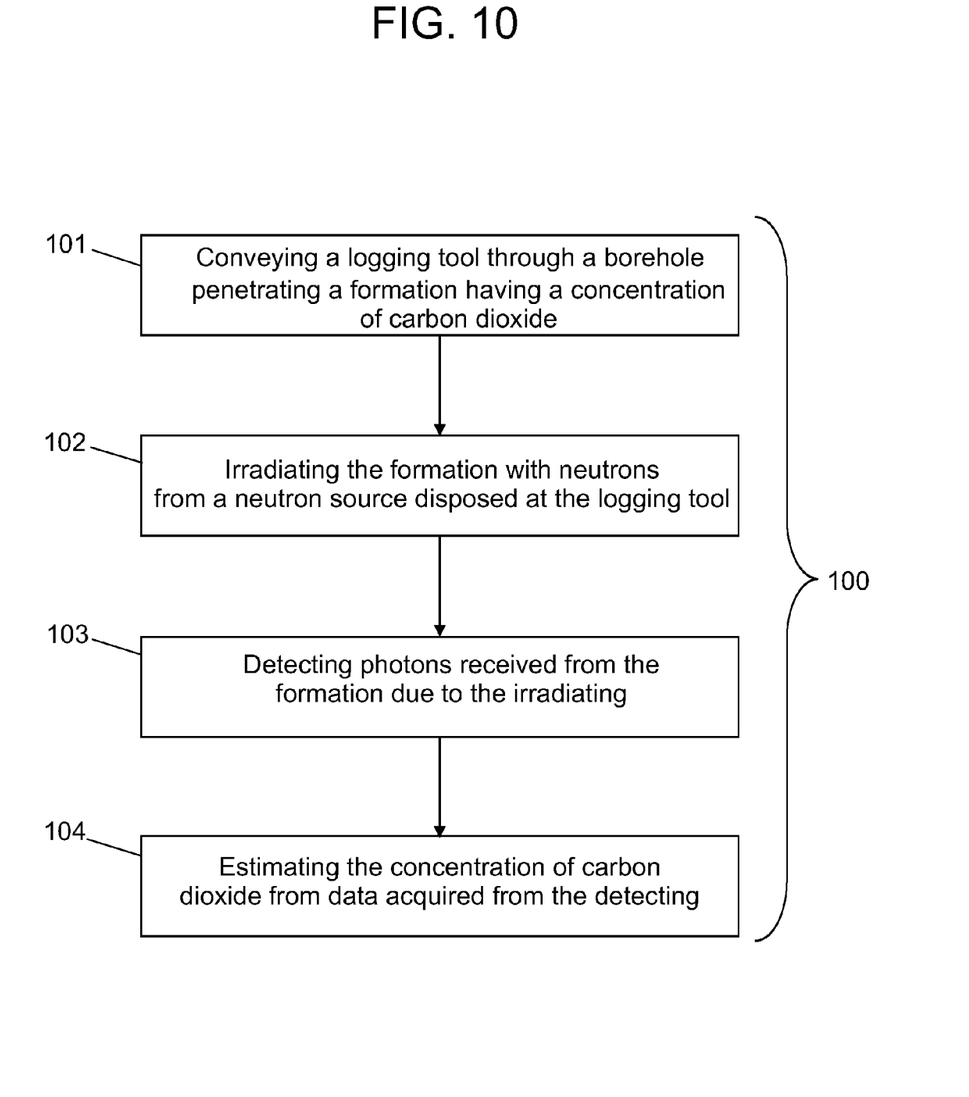
FIG. 10 presents one example of a method for estimating a level of $CO_2$ in the borehole.

FIG. 10 presents one example of a method 100 for estimating a level of $CO_2$ in a formation 3 penetrated by the borehole 2. The method 100 calls for (step 101) conveying the logging tool 10 through the borehole 2. Further, the method 100 calls for (step 102) irradiating the formation 3 with neutrons. Further, the method 100 calls for (step 103) detecting photons received from the formation 3 due to the irradiating. The detecting of a photon can include counting the photon, measuring a time of detection of the photon with respect to the irradiating, and measuring an amount of energy the photon possesses. Further, the method 100 calls for (step 104) estimating the level of $CO_2$ from data acquired from the detecting. The data can include a time spectrum, an energy spectrum, a ratio of counts of photons from neutron capture interactions received by two detectors spaced different distances from the neutron source 20 disposed in the logging tool 10, a ratio of counts of photons from neutron inelastic scattering interactions received by two detectors spaced different distances from the neutron source 20 disposed in the logging tool 10, and a thermal capture cross-section (sigma) of the formation 3.

One of the benefits of the method 100 is being able to estimate the level of $CO_2$ from data acquired from within a cased borehole. Alternatively, the techniques can also be employed in an uncased borehole. Another benefit is the ability to make an accurate estimate of the level of $CO_2$ due to being able to measure the physical properties of the $CO_2$ in the formation 3.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

In support of the teachings herein, various analysis components may be used, including a digital and/or an analog system. For example, the downhole electronics 13 or the topside equipment 7 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit, electromechanical unit, shielding or attenuators may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a concentration of carbon dioxide ($CO_2$) in a formation penetrated by a borehole, the method comprising:
    conveying a carrier through the borehole;
    irradiating the formation with fast neutrons from a neutron source disposed at the carrier;
    detecting photons from the formation resulting from the irradiating using a first detector spaced a first distance from the neutron source and a second detector spaced a second distance from the neutron source that is greater than the first distance; and
    estimating the concentration of $CO_2$ from data acquired from the detecting;
    wherein the estimating comprises using (a) a first ratio of photons from thermal neutron capture interactions detected by the first detector to photons from thermal neutron capture interactions detected by the second detector or (b) a second ratio of photons from fast neutron inelastic scattering interactions detected by the first detector to photons from fast neutron inelastic scattering interactions detected by the second detector.

2. The method of claim 1, wherein the borehole contains a casing and the carrier is disposed interior to the casing.

3. The method of claim 1, wherein the irradiating comprises irradiating with a pulse of fast neutrons.

4. The method of claim 3, wherein the neutrons comprise an energy of about 14 MeV.

5. The method of claim 1, wherein the detecting comprises at least one selection from a group consisting of counting the detected photons, measuring the energy of each detected photon, and measuring a time of detecting each photon with respect to the irradiating.

6. The method of claim 1 wherein the data comprises at least one selection from a group consisting of a time spectrum, an energy spectrum, a ratio of counts of inelastic photons received by the first detector to the same type of counts received by the second detector, a ratio of counts of thermal capture photons received the first detector to the same type of counts received by the second detector, and a thermal capture cross-section of the formation.

7. The method of claim 6, wherein a physical property of the CO2 in the formation is determined from the thermal capture cross-section.

8. The method of claim 7, wherein the physical property is determined from a phase diagram of CO2.

9. The method of claim 6, wherein the estimating comprises building a mathematical model of the formation based on the physical property, the model comprising a 0% CO2 line and a 100% CO2 line on a curve of an expected ratio of counts of photons from neutron capture interactions received by the first detector to the same type of counts received by the second detector versus porosity and a 0% CO2 line and a 100% CO2 line on a curve of an expected ratio of counts of photons from neutron inelastic scattering interactions received by the first detector to the same type of counts received by the second detector versus porosity.

10. The method of claim 9, wherein the estimating further comprises interpolating between the 0% CO2 lines and a 100% CO2 lines using the ratio of counts of photons from neutron capture interactions received by the first detector and the second detector and the ratio of counts of photons from neutron inelastic scattering interactions received by the first detector and the second detector.

11. The method of claim 1, wherein the carrier is conveyed by at least one of a wireline, a slickline, coiled tubing, and a drill string.

12. An apparatus configured to estimate a concentration of carbon dioxide (CO2) in a formation penetrated by a borehole, the apparatus comprising:
    a carrier configured to be conveyed through the borehole;
    a neutron source disposed at the carrier and configured to irradiate the formation with fast neutrons;
    a first detector spaced a first distance from the neutron source and configured to detect photons from the formation resulting from the irradiating;
    a second detector spaced a second distance from the neutron source that is greater than the first distance and configured to detect photons from the formation resulting from the irradiating; and
    a processor coupled to the first and second detectors and configured to estimate the concentration of CO2 from data acquired from the detectors;
    wherein the processor is further configured to use (a) a first ratio of photons from thermal neutron capture interactions detected by the first detector to photons from thermal neutron capture interactions detected by the second detector or (b) a second ratio of photons from fast neutron inelastic scattering interactions detected by the first detector to photons from fast neutron inelastic scattering interactions detected by the second detector to estimate the concentration of CO2.

13. The apparatus of claim 12, wherein the borehole contains a casing and the carrier is disposed interior to the casing.

14. The apparatus of claim 12, wherein the processor is further configured to perform at least one selection from a group consisting of counting detected photons, measuring energy of each detected photon, and measuring a time of detecting each photon with respect to the irradiating.

15. The apparatus of claim 12, wherein the neutron source is a pulsed neutron generator.

16. The apparatus of claim 12, wherein the processor is further configured to generate at least one selection from a group consisting of a time spectrum, an energy spectrum, a ratio of counts of inelastic photons received by the first detector to the same type of counts received by the second detector, a ratio of counts of thermal capture photons received by the first detector to the same type of counts received by the second detector, and a thermal capture cross-section of the formation.

17. The apparatus of claim 16, wherein the processor is further configured to estimate a physical property of the CO2 in the formation from the thermal capture cross-section.

18. The apparatus of claim 17, wherein the processor is further configured to build a mathematical model of the formation based on the physical property, the model comprising a 0% CO2 line and a 100% CO2 line on a curve of an expected ratio of counts of photons from neutron capture interactions received by the first detector to the same type of counts received by the second detector versus porosity and a 0% CO2 line and a 100% CO2 line on a curve of an expected ratio of counts of photons from neutron inelastic scattering interactions received by the first detector to the same type of counts received by the second detector versus porosity.

19. The apparatus of claim 18, wherein the processor is further configured to interpolate between the 0% $CO_2$ lines and a 100% $CO_2$ lines using the ratio of counts of photons from neutron capture interactions received by the first detector and the second detector and the ratio of counts of photons from neutron inelastic scattering interactions received by the first detector and the second detector to estimate the concentration of $CO_2$.

20. Machine-readable media comprising machine-executable instructions for estimating a concentration of carbon dioxide ($CO_2$) in a formation penetrated by a borehole by executing a method comprising:
   detecting photons from the formation resulting from irradiating the formation with fast neutrons from a neutron source disposed within the borehole using a first detector spaced a first distance from the neutron source and a second detector spaced a second distance from the neutron source that is greater than the first distance; and
   estimating the concentration of $CO_2$ from data acquired from the detecting;
   wherein the estimating comprises using (a) a first ratio of photons from thermal neutron capture interactions detected by the first detector to photons from thermal neutron capture interactions detected by the second detector or (b) a second ratio of photons from fast neutron inelastic scattering interactions detected by the first detector to photons from fast neutron inelastic scattering interactions detected by the second detector.

* * * * *